(12) United States Patent
Ramabhadran et al.

(10) Patent No.: US 9,748,844 B2
(45) Date of Patent: Aug. 29, 2017

(54) SYSTEMS AND METHODS FOR CONTROLLING AND IMPROVING POWER CONVERTERS (71) Applicant: GENERAL ELECTRIC COMPANY, Schenectady, NY (US)

(72) Inventors: Ramanujam Ramabhadran, Niskayuna, NY (US); Jeffrey Joseph Nasadoski, Gloversville, NY (US); Yehuda Daniel Levy, Lod (IL); Shimon Khananshvili, Lod (IL); Pradeep Vijayan, Bangalore (IN); Bruce Richard Roberts, Mentor-on-the-Lake, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/975,349

(22) Filed: Dec. 18, 2015

(65) Prior Publication Data
US 2017/0179829 A1    Jun. 22, 2017

(51) Int. Cl.
H05B 33/00    (2006.01)
H02M 3/158    (2006.01)
H02M 1/42    (2007.01)
H05B 37/02    (2006.01)
(Continued)

(52) U.S. Cl.
CPC ........... *H02M 3/1582* (2013.01); *H02M 1/12* (2013.01); *H02M 1/4208* (2013.01); *H05B 33/0815* (2013.01); *H05B 37/02* (2013.01)

(58) Field of Classification Search
CPC ............ H05B 33/0815; H05B 33/0806; H05B 33/0809; H05B 33/0845; H02M 1/4258; H02M 1/4225; H02M 3/28; H02M 1/12; H02M 3/33507; H02M 2001/0025;
(Continued)

(56) References Cited

U.S. PATENT DOCUMENTS 6,128,205 A    10/2000 Bernd et al.
7,450,407 B2   11/2008 Wu et al.
7,514,913 B2    4/2009 Zhang et al.
(Continued)

OTHER PUBLICATIONS

Li et al.,"A novel low THD 4-quadrant analog multiplier using feedforward compensation for PFC", ASIC (ASICON), 2011 IEEE 9th International Conference on, IEEE xplore, pp. 878-881, Oct. 25-28, 2011, Conference Location: Xiamen.
(Continued)

*Primary Examiner* — Monica C King
(74) *Attorney, Agent, or Firm* — Nitin N. Joshi (57) ABSTRACT

An electronic device includes a controller configured to regulate one or more voltages or currents of a power converter. The controller is configured to receive an input voltage of the power converter, determine whether the power converter is operating in a first mode of operation or a second mode of operation based at least in part on the input voltage, generate a multiplier reference signal for the power converter based on whether the power converter is operating in the first mode of operation or the second mode of operation, and adjust an input current of the power converter based at least in part on the multiplier reference signal. Adjusting the input current includes correcting the input current to be substantially identical in form to the input voltage.

6 Claims, 7 Drawing Sheets

(51) Int. Cl.
*H05B 33/08* (2006.01)
*H02M 1/12* (2006.01)

(58) Field of Classification Search
CPC ........... H02M 2001/007; H02M 7/125; H02M 1/4208; H02M 2001/4291
See application file for complete search history.

(56) References Cited

U.S. PATENT DOCUMENTS

| | | |
|---|---|---|
| 7,898,237 B2 | 3/2011 | Shao et al. |
| 8,129,958 B2 | 3/2012 | Ku et al. |
| 8,471,488 B1 | 6/2013 | Hopkins et al. |
| 8,957,600 B1 | 2/2015 | Levy |
| 2013/0201731 A1 | 8/2013 | Gu et al. |
| 2015/0146458 A1* | 5/2015 | Lim ...................... H02M 3/158 363/44 |

OTHER PUBLICATIONS

Dong et al.,"A variable-frequency one-cycle control for BCM flyback converter to achieve unit power factor", Industrial Electronics Society, IECON 2014—40th Annual Conference of the IEEE, pp. 1161-1166, Oct. 29, 2014-Nov. 1, 2014, Conference Location: Dallas, TX.

* cited by examiner

SYSTEMS AND METHODS FOR CONTROLLING AND IMPROVING POWER CONVERTERS

BACKGROUND OF THE INVENTION

The subject matter disclosed herein relates to electric power converters and, more specifically, to systems and methods for controlling and improving electric power converters.

Light emitting devices, such as light emitting diode (LED) lighting systems and Non-LED lamps (e.g., fluorescent lamps and halogen lamps) rely on semiconductor power converters to perform various power conversion and operational applications. This may involve regulating the voltage and/or the current of such power converters. Unfortunately, in certain semiconductor power converters in which the input current is chopped, for example, in boundary conduction mode (BCM) power conversion applications, any form of power factor correction may lead to higher total harmonic distortion (THD) in the output signal of the power converter. Such a scenario may thus lead to decreased power signal quality and integrity. It may be useful to provide an improved semiconductor power converter.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an electronic device includes a controller configured to regulate one or more voltages or currents of a power converter. The controller is configured to receive an input voltage of the power converter, determine whether the power converter is operating in a first mode of operation or a second mode of operation based at least in part on the input voltage, generate a multiplier reference signal for the power converter based on whether the power converter is operating in the first mode of operation or the second mode of operation, and adjust an input current of the power converter based at least in part on the multiplier reference signal. Adjusting the input current includes correcting the input current to be substantially identical in form to the input voltage.

In a second embodiment, a non-transitory computer-readable medium includes code with instructions to cause a processor to receive an input voltage of the power converter, cause the processor to determine whether the power converter is operating in a first mode of operation or a second mode of operation based at least in part on the input voltage, cause the processor to generate a multiplier reference signal for the power converter based on whether the power converter is operating in a first mode of operation or a second mode of operation, and to cause the processor adjust an input current of the power converter based at least in part on the multiplier reference signal. Adjusting the input current includes correcting the input current to be substantially identical to the input voltage.

In a third embodiment, a system includes a power converter configured to supply power to one or more lighting devices. The system also includes a controller coupled to the power converter and configured to generate a multiplier reference signal for the power converter based on whether the power converter is operating in a boost conversion mode of operation or a buck conversion mode of operation, adjust an input current of the power converter based at least in part on the multiplier reference signal, and to supply the adjusted input current to the power converter to reduce a total harmonic distortion (THD) of an output power signal of the power converter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to a boundary conduction mode (BCM) power factor correction (PFC) converter and a controller used to generate a multiplier reference signal, which may be provided to the converter to shape the input current such that the input current tracks the input voltage of the converter. For example, in certain embodiments, the controller may receive (e.g., sample) the input voltage (e.g., "$V_{In}$") of the converter, and may generate a multiplied reference signal $V_G$ when a boost conversion is performed and a multiplied reference signal $V_G^2$ when a buck conversion is performed (e.g., based on whether the converter is operating in a boost conversion mode of operation or a buck mode of operation). In this way, the present techniques may provide a power factor correction (PFC) multiplier useful in BCM applications and that achieves improved (e.g., decreased) total harmonic distortion (THD). The present embodiments may also include providing a buck-boost converter with positive output voltage polarity that eliminates the diode bridge. Specifically, the diode bridgeless buck-boost converter may be utilized for high-power LED drivers or other high-power applications, and may further increase power efficiency.

Figure 1:
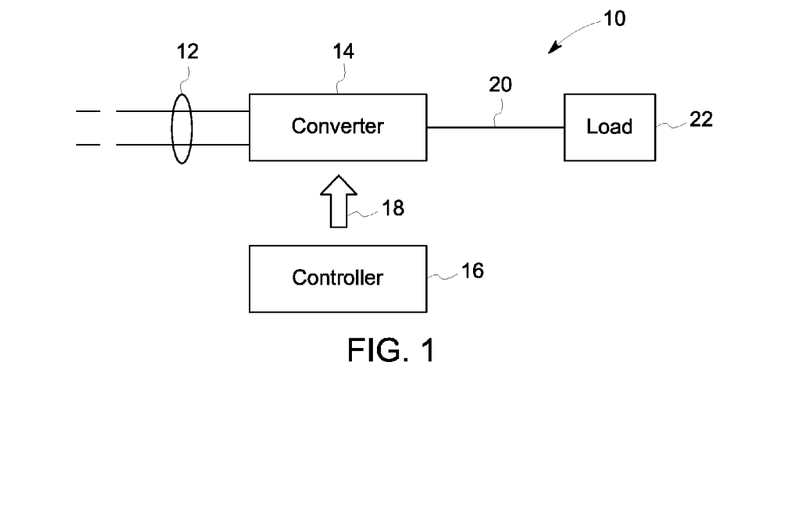
FIG. 1 is a block diagram of a power conversion and control system, in accordance with an embodiment.

With the foregoing in mind, FIG. 1 is a block diagram of a power conversion and control system 10. The system 10 may include power conductors 12 (e.g., single or poly-phase), a power converter 14, a controller 16 communicatively coupled via a communications link 18 to the converter 14, and a load 22 communicatively coupled via a communications link 20 to the converter 14. In certain embodiments, the system 10 may be used as an indoor lighting system, an outdoor lighting system, or other similar system for controlling the source of power, and by extension, for example, the voltage and current supplied to the load 22. For example, in one embodiment, the load 22 may include, for example, a light emitting diode (LED) lighting device or system (e.g., an LED lamp, an LED lighting system) and/or non-LED lighting device or system (e.g., a fluorescent lamp, a linear fluorescent lamp (LFL) system, a compact fluorescent (CFL) system, a halogen lamp, a high intensity discharge (HID) lamp, and so forth).

In certain embodiments, the converter 14 may include a number of active power electronic switching devices such as silicon-controlled rectifiers (SCRs), thyristors, insulated gate bipolar transistors (IGBTs), and so forth, which may be used to switch to and from "ON" (e.g., activated and/or enabled) and "OFF" (e.g., deactivated and/or disabled) states to control the power (e.g., voltage and current) flow to the load 22. For example, in the "OFF" state, the switching devices of converter 14 may restrict the flow of current to only a leakage current. Similarly, in the "ON" state, for example, the switching devices of converter 14 may conduct current when the input voltage exceeds a certain threshold voltage. Specifically, the converter 14 may be any electrical device(s) that transforms direct current (DC) electricity via a DC reactor link to alternating current (AC) electricity, or that transforms alternating current (AC) to electricity direct current (DC) electricity.

As previously discussed, the system 10 may also include the controller 16. The controller 16 may control the operation of the converter 14, and by extension, power (e.g., voltage and current) flowing to the load 22. Thus, the controller 16 may include a processor that may be used in processing computer instructions, and a memory that may be used to store computer instructions and other data. These instructions may be encoded in programs stored in a tangible non-transitory computer-readable medium such as the memory and/or other storage. In certain embodiments, the controller 16 may control the conversion and/or inversion of AC or DC power received, for example, from one or more lighting systems (e.g., LED lighting and/or non-LED lighting systems) by sending switching signals to a number of switching devices, such as IGBTs, SCRs, thyristors, and so forth, that may be included in the converter 14.

In one embodiment, the controller 16 may include one or more functions of using digital pulse signals (e.g., AC or DC) to produce an output voltage (e.g., AC or DC) level for control of the converter 14. For example, the controller 16 may transmit an "ON"/"OFF" period PWM signal to the converter 14, in which the converter 14 may be controlled to switch "ON" when the PWM signal is logically high (e.g., at the rising edge of the PWM signal), and switch "OFF" when the PWM signal is logically low (e.g., at the falling edge of the PWM signal). Thus, the controller 16 may, by extension, control the output (e.g., lighting and brightness), for example, of the load 22.

In some embodiments, for a boost converter, the input boost inductor may see (e.g., detect) a full average current. In such a case, and particularly in boundary conduction mode (BCM), it may be useful to provide a power factor correction circuit utilizing a zero crossing and peak detection algorithm. However, in certain converters in which the input current is chopped (e.g., when the current is interrupted before the natural current response settles to approximately zero), the input side of the boost converter may not see (e.g., detect) the full current. Thus, in such case, a zero detection and peak detection algorithm driven, for example, by an input voltage circuitry may not perform accurate for a power factor correction (e.g., increasing power factor at the source that delivers power to load 22 or shaping the input current to be identical in form to the input voltage). Accordingly, as will be discussed in further detail below, the controller 16 may include a multiplier that may implement BCM to achieve an improved (e.g., lower) total harmonic distortion (THD). Indeed, the multiplier may be utilized as part of a flyback converter, a buck converter, a boost converter, a buck-boost converter, a cascaded buck-boost converter, or any of various power converters.

Figure 2:
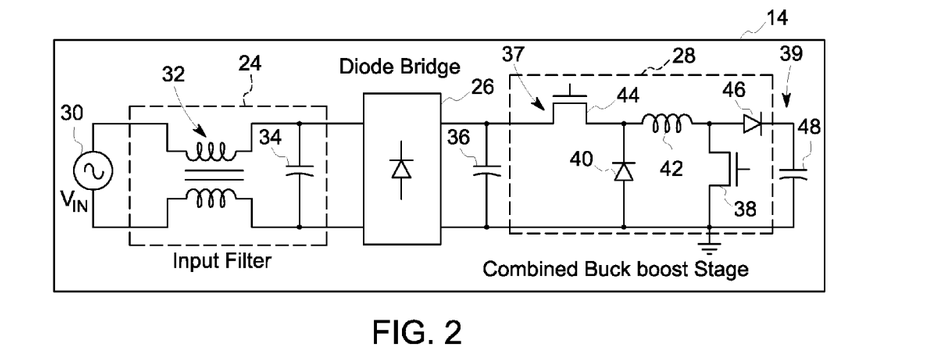
FIG. 2 is a schematic diagram of an embodiment of a boundary conduction mode (BCM) power factor correction (PFC) converter, in accordance with an embodiment.

Turning now to FIG. 2, which is a schematic diagram of an embodiment of the converter 14 discussed above. In certain embodiments, as depicted in FIG. 2, the converter 14 may include input filter 24 coupled to a diode bridge 26, which is in turn coupled to a combined buck and boost stage 28. During operation, the converter 14 may convert the voltage input generated by a voltage source 30 into load power utilizing the input filter 24, the diode bridge 26, and the combined buck and boost stage 28. As depicted, the input filter 24 may include a winding 32 and capacitor 34 useful in removing any harmonics and/or other undesirable frequency components from the voltage input generated by a voltage source 30.

The diode bridge 26 may include a configuration (e.g., an H-bridge configuration) of diodes (e.g., D1, D2, D3, and D4) for converting (e.g., rectifying) in conjunction with a capacitor 36 the incoming AC voltage signal (e.g., 115V, 120V, 200V, 208V, 230V, or similar voltage rating) generated via the voltage source 30 into a filtered DC voltage signal. The rectified and filtered DC voltage signal may then be transmitted to the combined buck and boost stage 28. The combined buck and boost stage 28 may include a boost circuitry 39 and buck circuitry 37. As depicted, the boost circuitry 39 may include a power switch 38 (e.g., semiconductor switch such as SCRs, thyristors, IGBTs, and so forth), a diode 40, and an inductor 42. Similarly, the buck circuitry 37 may include a power switch 44 (e.g., semiconductor switch such as SCRs, thyristors, IGBTs, and so forth), a diode 46, and a capacitor 48. In certain embodiments, the boost circuitry 37 may increase the voltage of the received DC voltage signal and the buck circuitry 37 to accommodate bus voltage variations. In some embodiments, the boost circuitry 39 may raise the voltage of the received DC voltage signal to approximately 240V, approximately 277V, or approximately 480V, or other similar voltage magnitude. The buck circuitry 37 may then decrease the voltage of the received DC voltage signal to the desired voltage for the load 22.

Figure 3:
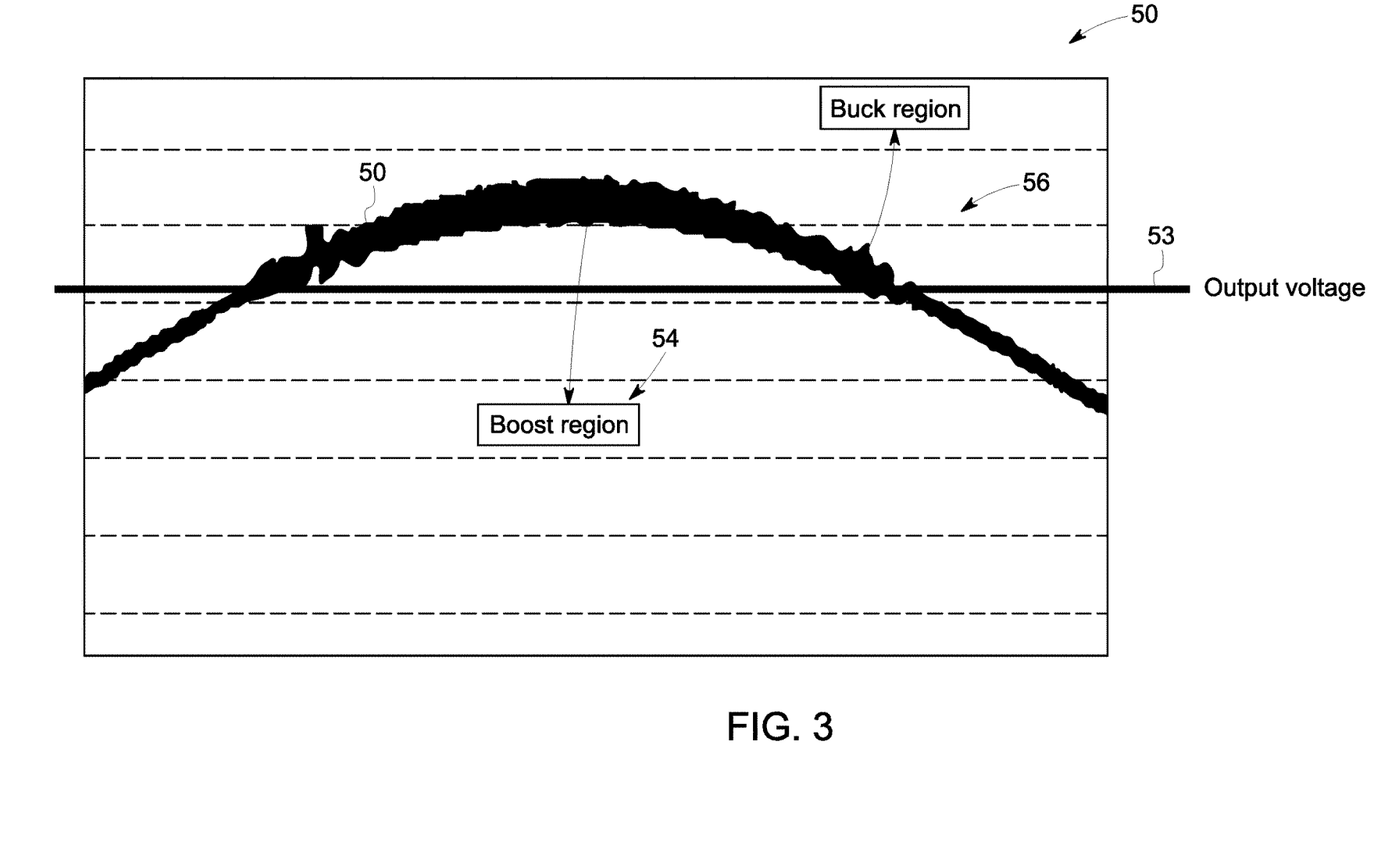
FIG. 3 illustrates a waveform plot depicting an input voltage generated versus an output voltage of the converter of FIG. 2, in accordance with an embodiment.

FIG. 3 illustrates a waveform plot 50 depicting the input voltage 52 (e.g., normalized to a half-cycle) generated by the converter 14 (e.g., BCM converter 14) versus an output voltage 53. As depicted by FIG. 3 and as will be further appreciated with respect to FIGS. 4-7, when the magnitude of the input voltage 52 is below the output voltage 53, the controller 16 may determine that converter 14 is operating in the boost converter region 54 (e.g., boost conversion mode of operation). Similarly, when the magnitude of the input voltage 52 rises above the output voltage 53, the controller 16 may determine that converter 14 is operating in the buck converter region 56 (e.g., buck conversion mode of operation). The input voltage 52 as depicted in FIG. 3 also illustrates that without the presently disclosed power factor correction techniques, the input voltage 52 may include increased total harmonic distortion (THD) (e.g., as illustrated by the frequency jitter or skew 57 in the input voltage 52).

Figure 4:
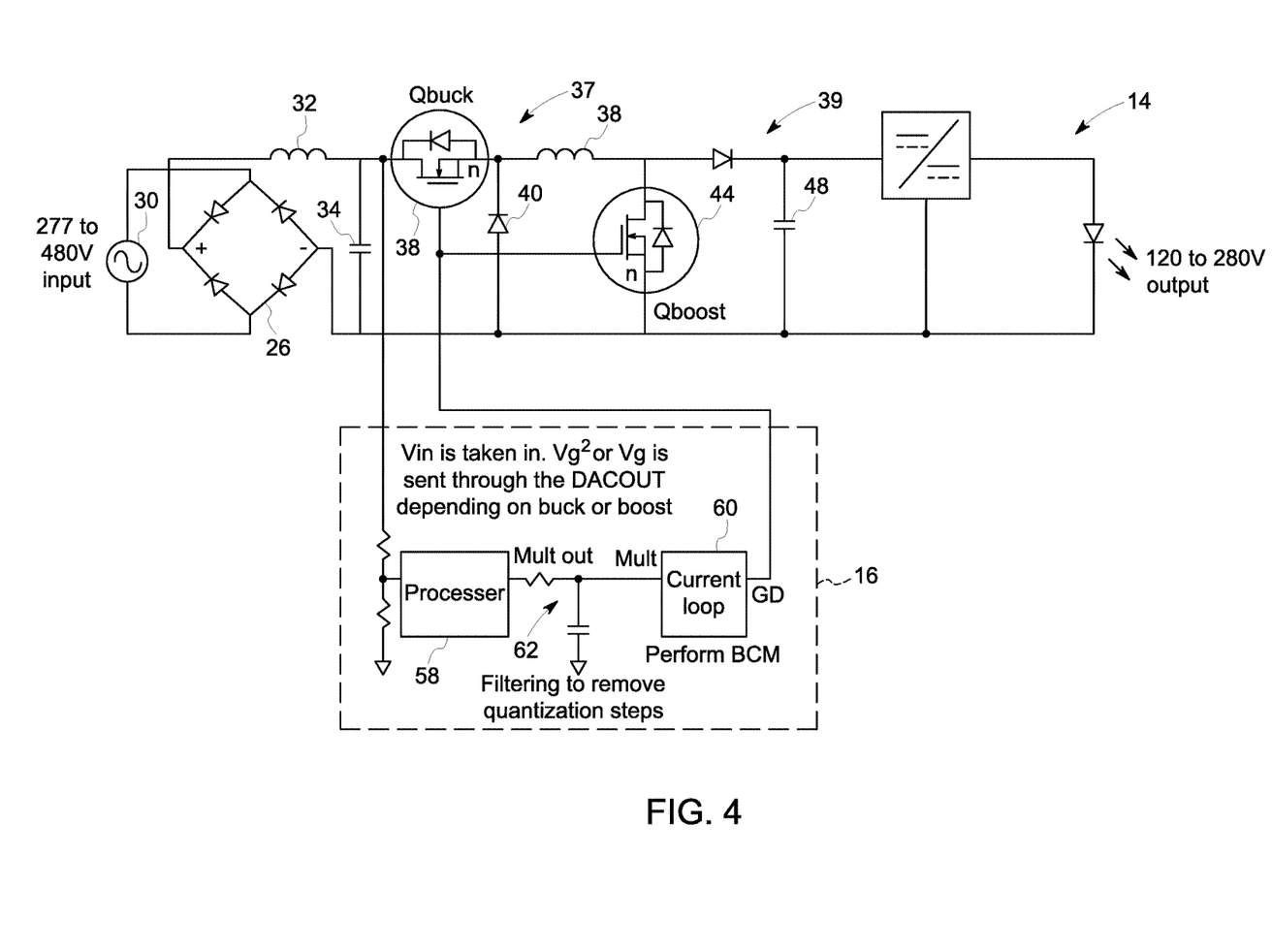
FIG. 4 is a schematic diagram of an embodiment of the converter of FIG. 2 including a controller, in accordance with an embodiment.

In certain embodiments, as illustrated in FIG. 4, it may be useful to include a processor 58 and current loop 60 (e.g., transition mode (TM) controller) that may be included as part of the controller 16. In certain embodiments, the processor 58 may be used to generate a multiplier reference signal, which may be provided to the current loop 60 to shape the input current such that the input current tracks the input voltage (e.g., "$V_{In}$"). For example, as depicted in FIG. 4, the processor 58 may receive (e.g., sample) the input voltage (e.g., "$V_{In}$") and may generate a multiplied reference signal $V_G$ when a boost conversion is being performed and a multiplied reference signal $V_G^2$ when a buck conversion is being performed. In some embodiments, $V_G$ may be equal in magnitude to the input voltage (e.g., "$V_{In}$"), or, in other embodiments, may itself be representative of the input voltage of the converter 14.

Specifically, the multiplied reference signal (e.g., $V_G$ for the boost conversion or $V_G^2$ for the buck conversion) may be adjusted in amplitude to get a certain output voltage, as well as a desired input current shape. Furthermore, the processor 58 may transition between calculating the multiplied reference signal $V_G$ for the boost conversion and $V_G^2$ for the buck conversion based on, for example, whether the converter 14 is operating in the boost conversion mode of operation or the buck conversion mode of operation. For example, as previously discussed with respect to FIG. 3, when the magnitude of the input voltage 52 is below an output voltage 53, the controller 16 may determine that converter 14 is operating in the boost converter region 54 (e.g., boost conversion mode of operation). Similarly, when the magnitude of the input voltage 52 rises above the output voltage 53, the controller 16 may determine that converter 14 is operating in the buck converter region 56 (e.g., buck conversion mode of operation).

In some embodiments, the presently discussed power factor correction techniques may be based on the specific topology of the converter 14. For example, for a cascaded buck-boost converter 14, the processor 58 may generate a different multiplied reference signal for each cascade converter, in which the multiplied reference signal may be generally expressed as: $K1*V_G^n + K2*V_G^{n-1} + \ldots KN1$. In one embodiment, the processor 58 may switch between generating multiplied reference signals by applying on one or more gain scheduling algorithms. As further depicted, the processor 58 may output the multiplied reference signal to a filter 62 to remove quantization steps from the signal. The multiplied reference signal may be then passed to the current loop 60 to shape (e.g., adjust) the input current to be substantially identical in form to the input voltage (e.g., "$V_{In}$"). The converter 14 may then provide an adjusted output voltage signal (e.g., 120V to 280V output voltage) to drive the load 22. Thus, the present techniques may provide a power factor correction multiplier useful BCM applications and that achieves improved (e.g., decreased) THD. It should be appreciated that the presently discussed power factor correction techniques may be performed via analog techniques and/or via digital techniques.

Figure 5:
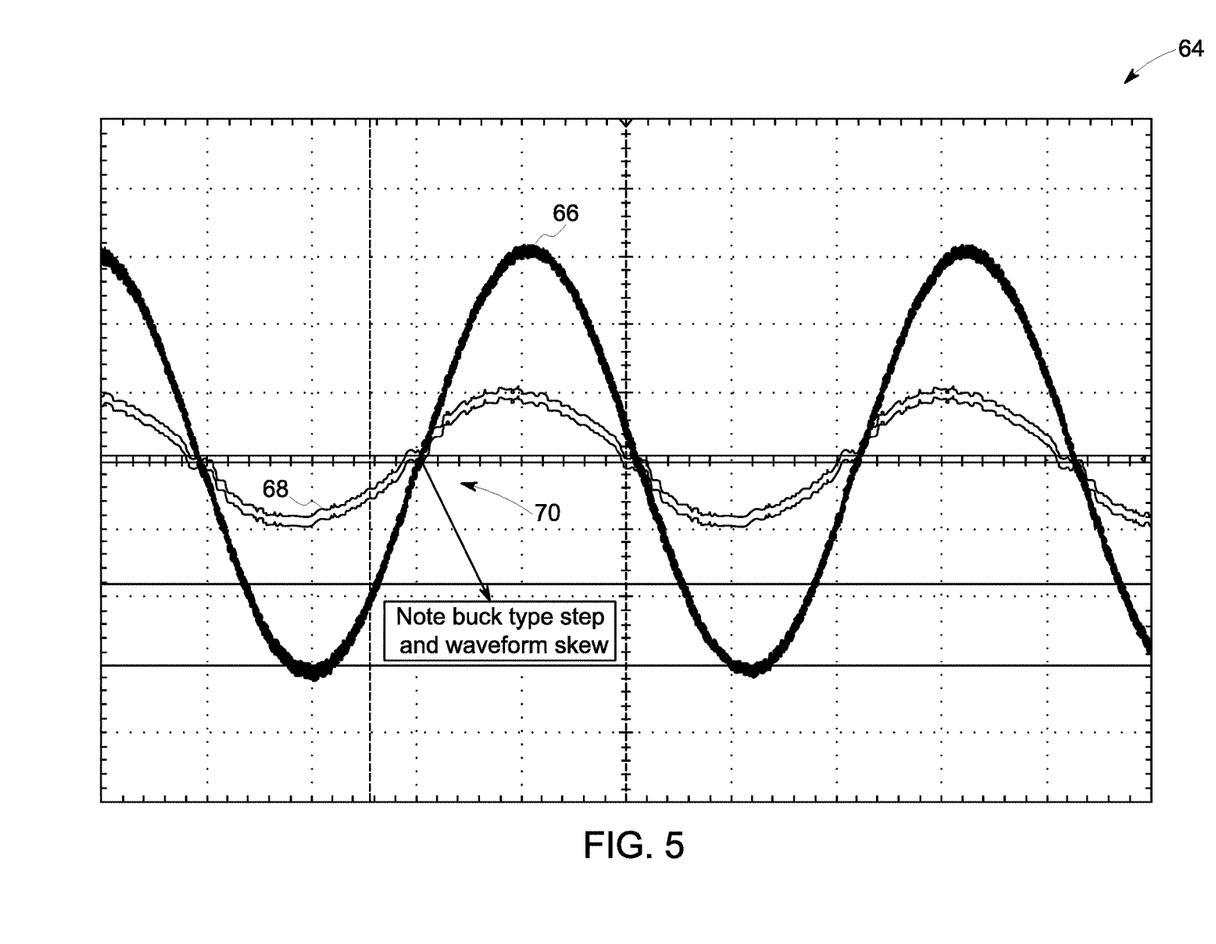
FIG. 5 is a plot of an input voltage signal and an input current signal, in accordance with an embodiment.

FIG. 5 depicts a plot 64, which illustrates an input voltage signal 66 (e.g., "$V_{In}$") and an input current signal 68 (e.g., "$I_{In}$") generated without using the presently disclosed power factor correction techniques. For example, as illustrated in FIG. 5, the input current signal 68 (e.g., "$I_{In}$") may include a buck conversion step and waveform skew 70, which may result in signal integrity degradation (e.g., increased THD) and/or other signal and power inefficiencies.

Figure 6:
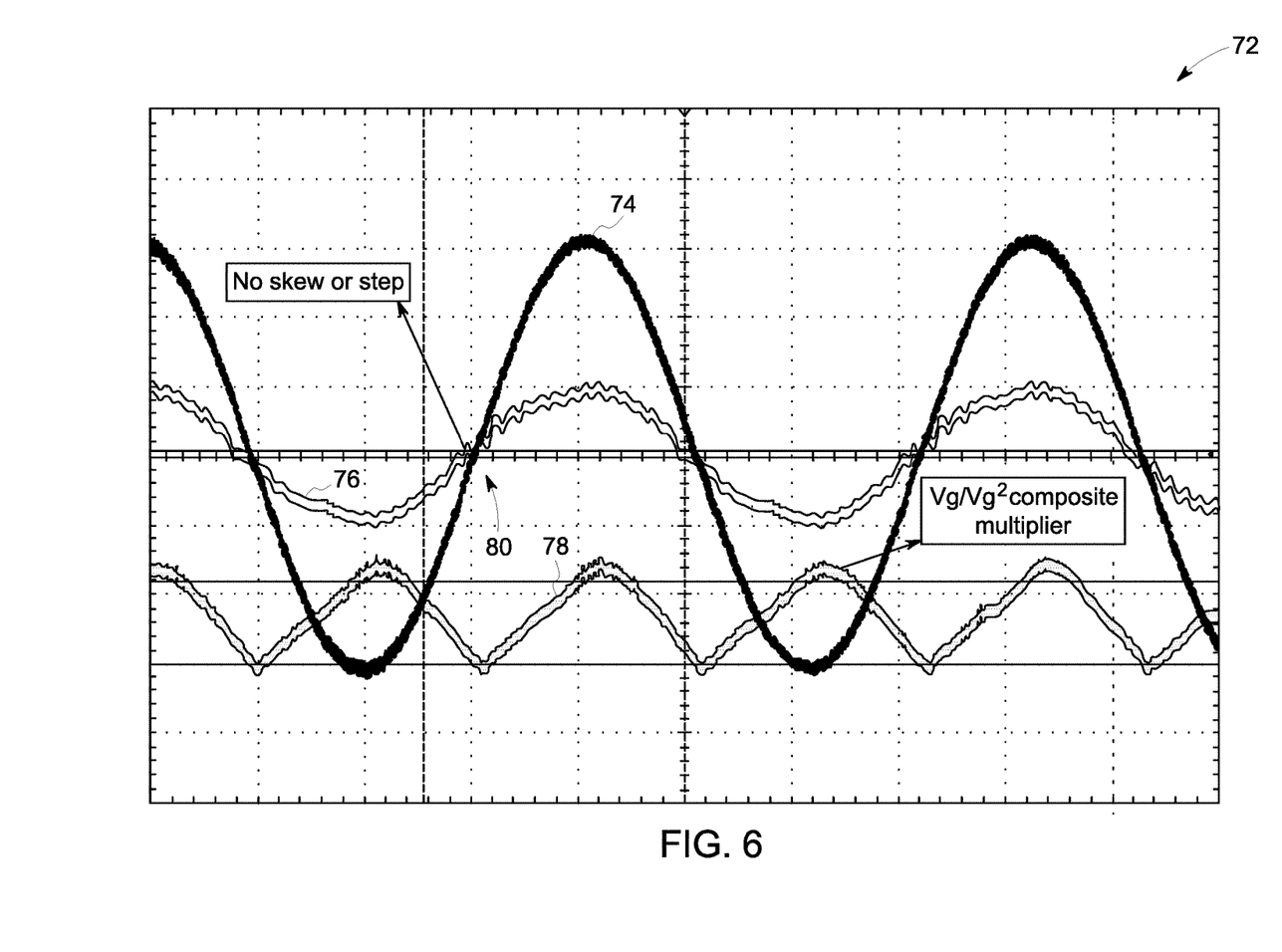
FIG. 6 is a plot of an input voltage signal and an input current signal adjusted using the multiplier reference signal, in accordance with an embodiment.

On the other hand, FIG. 6 depicts a plot 72 illustrating an input voltage signal 74 (e.g., "$V_{In}$") and an input current signal 76 (e.g., "$I_{In}$") generated utilizing the presently disclosed power factor correction techniques. For example, as illustrated in FIG. 6, the input current signal 76 (e.g., "$I_{In}$") may not include any step and waveform skew at point 80 (as compared to the buck conversion step and waveform skew 70 in FIG. 5), and more specifically, may include improved (e.g., decreased) THD. Similarly, FIG. 6 illustrates the multiplied reference signal 78 (e.g., composite multiplier signal $V_G$ for the boost conversion and $V_G^2$ for the buck conversion signal) with improved (e.g., decreased) THD. Thus, as previously discussed with respect to FIG. 4, the present techniques may provide a power factor correction multiplier useful in BCM applications and that achieves improved (e.g., decreased) THD.

Figure 7:
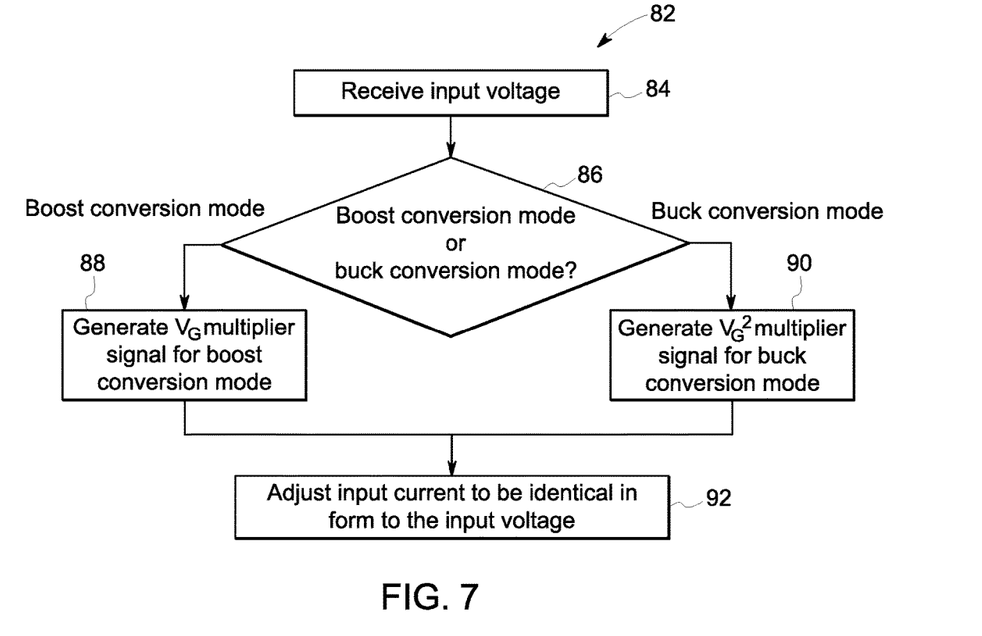
FIG. 7 is a flow diagram illustrating an embodiment of a process useful in generating a multiplier reference signal to adjust (e.g., shape) an input current, in accordance with an embodiment.

Turning now to FIG. 7, a flow diagram is presented, illustrating an embodiment of a process 82 useful in generating a multiplier reference signal adjust (e.g., shape) an input current to track an input voltage by using, for example, the controller 16 depicted in FIGS. 1 and 4. The process 82 may include code or instructions stored in a non-transitory machine-readable medium (e.g., a memory device included in the controller 16) and executed, for example, by the one or more processors 58 included in the controller 16. The process 82 may begin with the controller 16 receiving (block 84) an input voltage (e.g., input voltage "$V_{In}$"). The process 82 may then continue with the controller 16 determining (decision 86) whether a converter is operating in a boost conversion mode or a buck conversion mode.

For example, if the converter 14 is operating in the boost conversion mode, the process 82 may then continue with the controller 16 generating (block 88) a multiplier reference signal $V_G$. On the other hand, if the converter 14 is operating in the buck conversion mode, the process 82 may continue with the controller 16 generating (block 90) a multiplier reference signal $V_G^2$. The process 82 may then conclude with the controller 16 adjusting (block 92) the input current to be identical in form to the input voltage. For example, the multiplied reference signal (e.g., $V_G$ for the boost conversion or $V_G^2$ for the buck conversion) may be adjusted in amplitude to get a certain output voltage, as well as a desired input current shape. In this way, the present techniques may provide a power factor correction multiplier useful in BCM applications and that achieves improved (e.g., decreased) THD.

Figure 8:
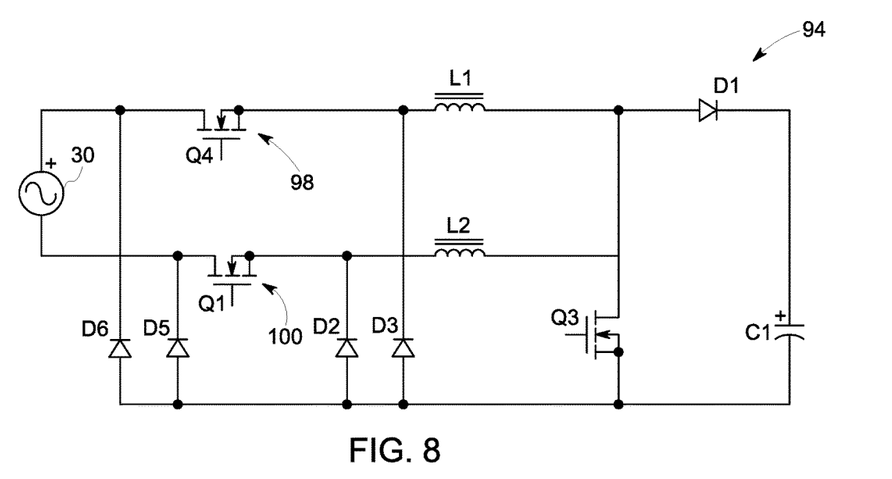
FIG. 8 is a schematic diagram of an embodiment of a bridgeless converter, in accordance with an embodiment.
Figure 9:
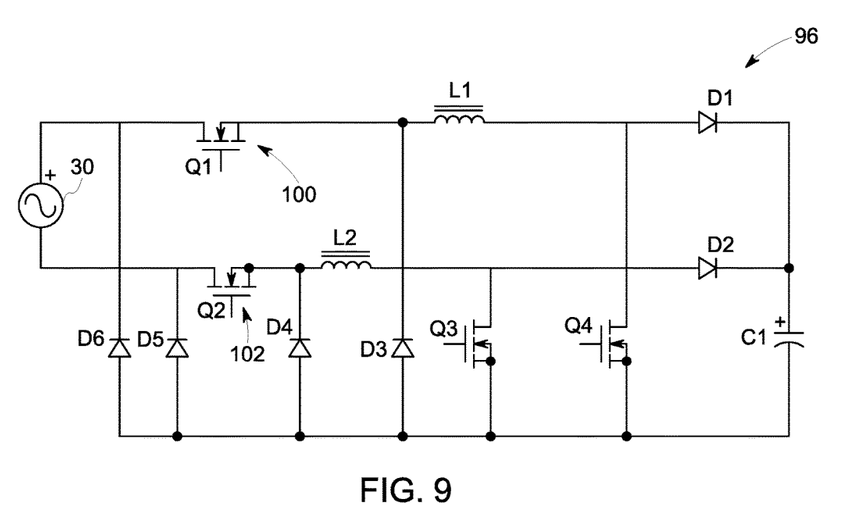
FIG. 9 is a schematic diagram of another embodiment of a bridgeless converter, in accordance with an embodiment.

In other embodiments, it may be useful to provide one or more buck-boost converters 94 and 96 with positive output voltage polarity that eliminates the diode bridge, as illustrated by FIGS. 8 and 9. Specifically, the diode bridgeless buck-boost converters 94 and 96 may be utilized for high-power LED drivers or other high-power applications, and may further increase power efficiency. For example, in some embodiments, as oppose to a maximum output power of approximately 150 watts (W), the diode bridgeless buck-boost converter may achieve a maximum output power of approximately 300W or more, as well as a high voltage input. Indeed, in some embodiments, the diode bridgeless buck-boost converters 94 and 96 may allow an increase in the maximum power output (e.g., from approximately 150W to approximately 300W) by eliminating certain electrical components (e.g., diodes and/or diode bridge) of the converter and splitting the power between two inductors at the input, while preserving power factor correction and providing a positive polarity output voltage.

In some embodiments, the diode bridgeless buck-boost converter may include one or more field effect transistors (FETs) (e.g., FETs 98, 100, and 102 of FIGS. 8 and 9) in place of the diodes and/or diode bridge to improve the efficiency of, for example, the converters 94 and 96. In one embodiment, the diode bridgeless buck-boost converter may also include zero voltage switching (ZVS) and/or zero current switching (ZCS) (e.g., activating and deactivating switches of the converter with a zero voltage and/or zero current). Accordingly, providing diode bridgeless buck-boost converters 94 and 96 with positive polarity output voltage may include the advantages of increased efficiency, decreased physical size, compatibility with isolated or non-isolated inputs, among various other advantages.

Technical effects of present embodiments relate to a boundary conduction mode (BCM) power factor correction (PFC) converter and a controller used to generate a multiplier reference signal, which may be provided to the converter to shape the input current such that the input current tracks the input voltage of the converter. For example, in certain embodiments, the controller may receive (e.g., sample) the input voltage (e.g., "$V_{In}$") of the converter, and may generate a multiplied reference signal $V_G$ when a boost conversion is performed and a multiplied reference signal $V_G^2$ when a buck conversion is performed (e.g., based on whether the converter is operating in a boost conversion mode of operation or a buck mode of operation). In this way, the present techniques may provide a power factor correction (PFC) multiplier useful in BCM applications and that achieves improved (e.g., decreased) total harmonic distortion (THD). The present embodiments may also include providing a buck-boost converter with positive output voltage polarity that eliminates the diode bridge. Specifically, the diode bridgeless buck-boost converter may be utilized for high-power LED drivers or other high-power applications, and may further increase power efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
 a power converter configured to supply power to one or more lighting devices; and
 a controller coupled to the power converter and configured to:
  generate a first multiplier reference signal for the power converter when the power converter is operating in a boost conversion mode of operation;
  generate a second multiplier reference signal for the power converter when the power converter is operating in a buck conversion mode of operation, wherein the first multiplier reference signal is different from the second multiplier reference signal;
  adjust an input current of the power converter based at least in part on the multiplier reference signal; and
  supply the adjusted input current to the power converter to reduce a total harmonic distortion (THD) of an output power signal of the power converter.

2. The system of claim 1, wherein the controller is configured to alternately switch between generating a first multiplier reference signal when the power converter is operating in the boost conversion mode of operation and generating a second multiplier reference signal when the power converter is operating in the buck conversion mode of operation.

3. The system of claim 1, wherein the power converter comprises a buck-boost converter configured to produce a power rating of approximately 300 watts (W), and wherein the buck-boost converter does not include a diode bridge.

4. The system of claim 3, wherein the buck-boost converter comprises a field effect transistor (FET) in place of the diode bridge.

5. The system of claim 1, wherein, when the power converter is operating in the boost conversion mode of operation, the controller is configured to generate the first multiplier reference signal expressed as: $V_G$.

6. The system of claim 1, wherein, when the power converter is operating in the buck conversion mode of operation, the controller is configured to generate the second multiplier reference signal expressed as: $V_G^2$.

* * * * *